(12) United States Patent
Ito

(10) Patent No.: US 10,513,203 B2
(45) Date of Patent: Dec. 24, 2019

(54) SLIDING DEVICE

(71) Applicant: TOYOTA BOSHOKU KABUSHIKI KAISHA, Aichi (JP)

(72) Inventor: Sadao Ito, Aichi (JP)

(73) Assignee: TOYOTA BOSHOKU KABUSHIKI KAISHA, Aichi (JP)

(*) Notice: Subject to any disclaimer, the term of this patent is extended or adjusted under 35 U.S.C. 154(b) by 0 days.

(21) Appl. No.: 16/048,748

(22) Filed: Jul. 30, 2018

(65) Prior Publication Data
US 2019/0061564 A1 Feb. 28, 2019

(30) Foreign Application Priority Data

Aug. 28, 2017 (JP) .................................. 2017-163294

(51) Int. Cl.
B60N 2/07 (2006.01)
B60N 2/06 (2006.01)
(52) U.S. Cl.
CPC .......... *B60N 2/0725* (2013.01); *B60N 2/067* (2013.01); *B60N 2/0705* (2013.01); *B60N 2/0715* (2013.01)
(58) Field of Classification Search
USPC ........ 248/424, 429, 419; 297/311, 337, 314; 296/65.01, 65.13, 65.11
See application file for complete search history.

(56) References Cited

U.S. PATENT DOCUMENTS

| 5,275,369 A * | 1/1994 | Kamata ................. B60N 2/071 248/345.1 |
| 5,285,993 A * | 2/1994 | Kamata ................. B60N 2/071 248/345.1 |
| 5,482,243 A * | 1/1996 | Minder ................. B60N 2/072 248/345.1 |
| 8,313,149 B2 * | 11/2012 | Miyazaki ............. B60N 2/0725 297/463.1 |
| 2010/0090083 A1* | 4/2010 | Kojima ................ B60N 2/0725 248/429 |
| 2010/0288903 A1* | 11/2010 | Koga ................... B60N 2/0232 248/429 |

FOREIGN PATENT DOCUMENTS

JP 2014-233996 12/2014

* cited by examiner

Primary Examiner — Alfred J Wujciak
(74) Attorney, Agent, or Firm — Greenblum & Bernstein, P.L.C.

(57) ABSTRACT

A sliding device in one aspect of the present disclosure includes a fixed rail, a movable rail, and a rail cover. The movable rail is slidable with respect to the fixed rail. The rail cover covers an outer periphery of a first end in the longitudinal direction of the fixed rail, and is slidable in the longitudinal direction. The rail cover is displaced by sliding with the movable rail when the first end in the longitudinal direction of the movable rail is displaced to protrude from the first end of the fixed rail.

6 Claims, 12 Drawing Sheets

SLIDING DEVICE

CROSS-REFERENCE TO RELATED APPLICATIONS

This application claims the benefit of Japanese Patent Application No. 2017-163294 filed on Aug. 28, 2017 with the Japan Patent Office, the entire disclosure of which is incorporated herein by reference.

BACKGROUND

The present disclosure relates to a sliding device that slidably supports a seat main body of a vehicle seat.

A sliding device disclosed in Japanese Unexamined Patent Application Publication No. 2014-233996 includes: a fixed rail such as a lower rail; a movable rail such as an upper rail that slides inside the fixed rail; and a front-side cover and a rear-side cover that cover a top-side opening of the fixed rail.

The front-side cover is provided ahead of a front end of the movable rail. The rear-side cover is provided behind a rear end of the movable rail. The front-side cover and the rear-side cover are displaced by sliding in conjunction with a slide displacement of the movable rail.

SUMMARY

When the movable rail slides forward and the front end of the movable rail protrudes from a front end of the fixed rail, a track face of the movable rail is exposed. A rolling element which is a steel ball, or a sliding member such as a shoe, for example, contacts the track face of the movable rail. Therefore, a lubricant such as a grease is often applied to the track face of the movable rail.

In the sliding device disclosed in the above-mentioned publication, when the movable rail largely slides, the track face is exposed and the lubricant may adhere to parts other than the sliding device (for example, shoes of an occupant).

One aspect of the present disclosure provides a sliding device that slidably supports a seat main body of a vehicle seat. The sliding device includes: a fixed rail that is directly or indirectly fixed to a floor; a movable rail to-which the seat main body is secured; and a rail cover. The movable rail is slidable with respect to the fixed rail in a state in which at least a part of the movable rail is housed in the fixed rail. The rail cover covers an outer periphery of a first end in a longitudinal direction of the fixed rail and is slidable in the longitudinal direction. Also, the rail cover is displaced by sliding together with the movable rail, when a first end in a longitudinal direction of the movable rail is displaced to protrude from the first end in the longitudinal direction of the fixed rail.

Thus, when the movable rail largely slides and the track face of the movable rail is exposed from the fixed rail, it is possible to inhibit a lubricant from adhering to parts other than the sliding device.

The sliding device may include a screw rod, and a nut that meshes with the screw rod. The screw rod is fixed inside the fixed rail in a state disposed inside the fixed rail, and extends in a direction parallel to the longitudinal direction of the fixed rail. The nut is rotatably supported by the movable rail and receives a rotational force to rotate. Further, the rail cover may include a cover main body, and a screw cover that is detachably attached to the cover main body and covers the screw rod.

Presence of the screw cover allows an operator, after assembling the rail cover to the fixed rail, to insert a fastener such as a bolt into a bolt hole to secure the fixed rail to a vehicle, and then to attach the screw cover to the rail cover. Thus, assembling workability of the bolt can be improved.

The sliding device may include a locking portion for detachably attaching the screw cover to the cover main body. The locking portion is elastically deformed upon attachment/detachment of the screw cover. Therefore, the operator can easily attach the screw cover to the rail cover.

The sliding device may include a spring that is disposed outside the fixed rail and applies to the rail cover an elastic force that displaces by sliding the rail cover toward a second end in the longitudinal direction of the fixed rail.

By disposing the spring outside the fixed rail, the operator can easily install the spring. In the sliding device disclosed in the above-mentioned publication, the spring is disposed inside the fixed rail or the movable rail. Thus, assembling workability of the spring is low.

The sliding device may include a second rail cover that covers an outer periphery of the second end in the longitudinal direction of the fixed rail and is slidable in the longitudinal direction. When a second end in the longitudinal direction of the movable rail is displaced to protrude from the second end in the longitudinal direction of the fixed rail, the second rail cover is displaced by sliding with the movable rail. Also, the spring may be coupled to the rail cover at one end, and is coupled to the second rail cover at the other end.

Therefore, as compared to a case in which a spring is provided in each of the rail cover and the second rail cover, the number of springs can be reduced. Increase in the number of assembling steps due to increase in the number of components can be inhibited.

BRIEF DESCRIPTION OF THE DRAWINGS

An example embodiment of the present disclosure will be described hereinafter with reference to the accompanying drawings, in which.

DETAILED DESCRIPTION OF THE PREFERRED EMBODIMENTS

An "embodiment" described below shows an example embodiment within the technical scope of the present disclosure. In other word, matters that specify the invention recited in the claims are not limited to the specific configuration, structure, etc. defined in the embodiments below.

Arrows and the like indicating directions attached to respective figures are provided to make it easy to understand the relationship between the respective figures. The present disclosure is not limited to the arrows (directions) and the like attached to the respective figures. Each direction indicates a direction in a state in which a vehicle seat according to the present embodiment is assembled to a vehicle.

An "occupant" in the present description refers to a vehicle occupant or a user of a vehicle seat.

First Embodiment

1. Outline of Vehicle Seat

Figure 1:
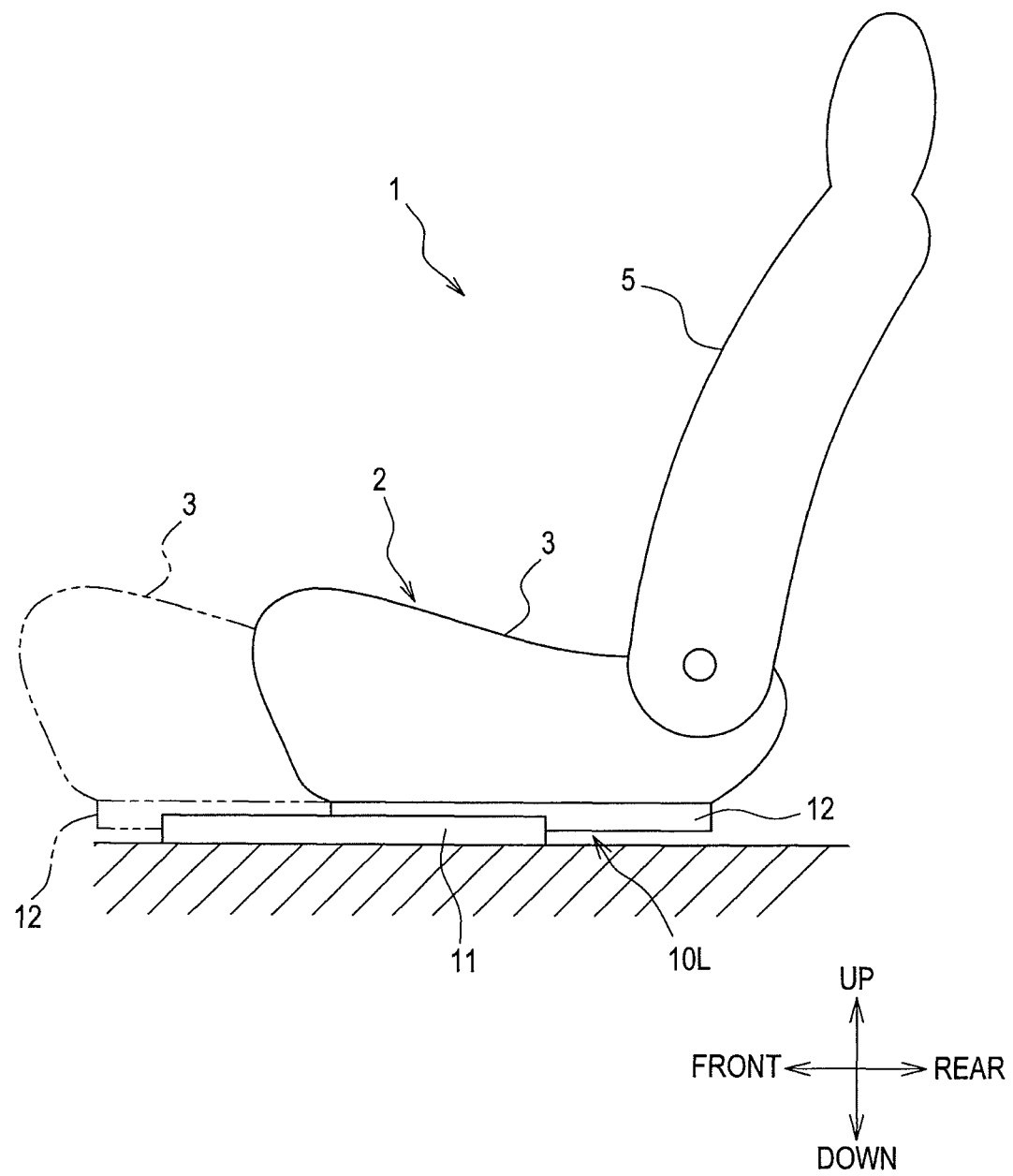
FIG. 1 is a schematic view of a vehicle seat according to an embodiment.

The present embodiment describes a vehicle seat 1 shown in FIG. 1. The vehicle seat 1 includes at least a seat main body 2, a first sliding device 10R and a second sliding device 10L. The seat main body 2 has a seat cushion 3 and a seatback 5.

The seat cushion 3 supports the buttocks of an occupant. The seatback 5 supports the back of the occupant. The sliding devices 10R, 10L slidably support the seat main body 2.

2. Sliding Device 2.1 Outline of Sliding Device

<Basic Structure>

The seat main body 2 is supported by the first sliding device 10R and the second sliding device 10L. A shown in FIG. 2, the first sliding device 10R is arranged on a right side in a seat-width axis. The second sliding device 10L is arranged on a left side in the seat-width axis.

The first sliding device 10R and the second sliding device 10L have the same structure. The following describes the first sliding device 10R.

Figure 3:
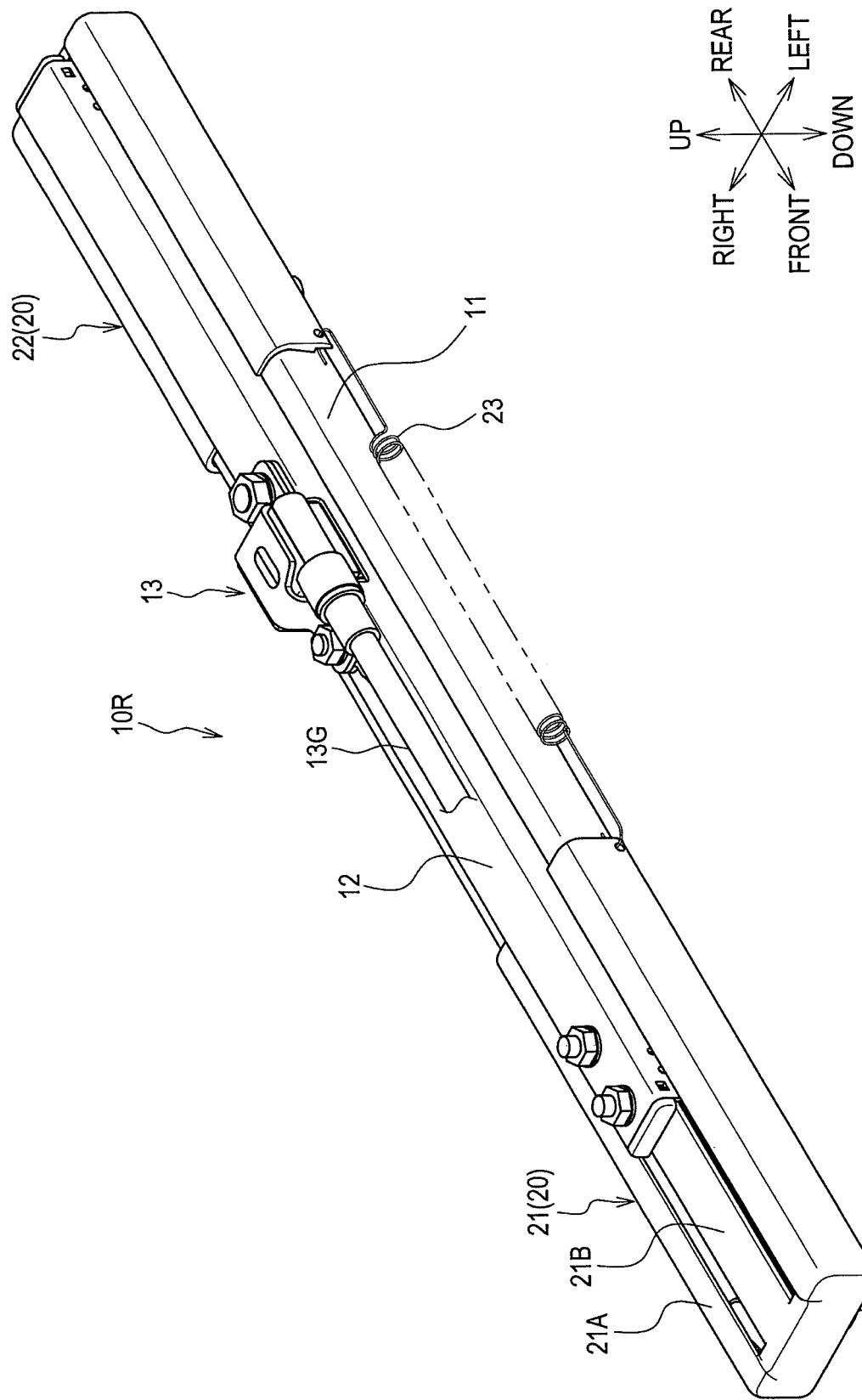
FIG. 3 is a view of the first sliding device according to the first embodiment.

The first sliding device 10R, as shown in FIG. 3, at least includes a fixed rail 11, a movable rail 12, a first rail cover 21 and a second rail cover 22. The fixed rail 11 is a metal member, which is directly or indirectly fixed to the vehicle.

Figure 4:
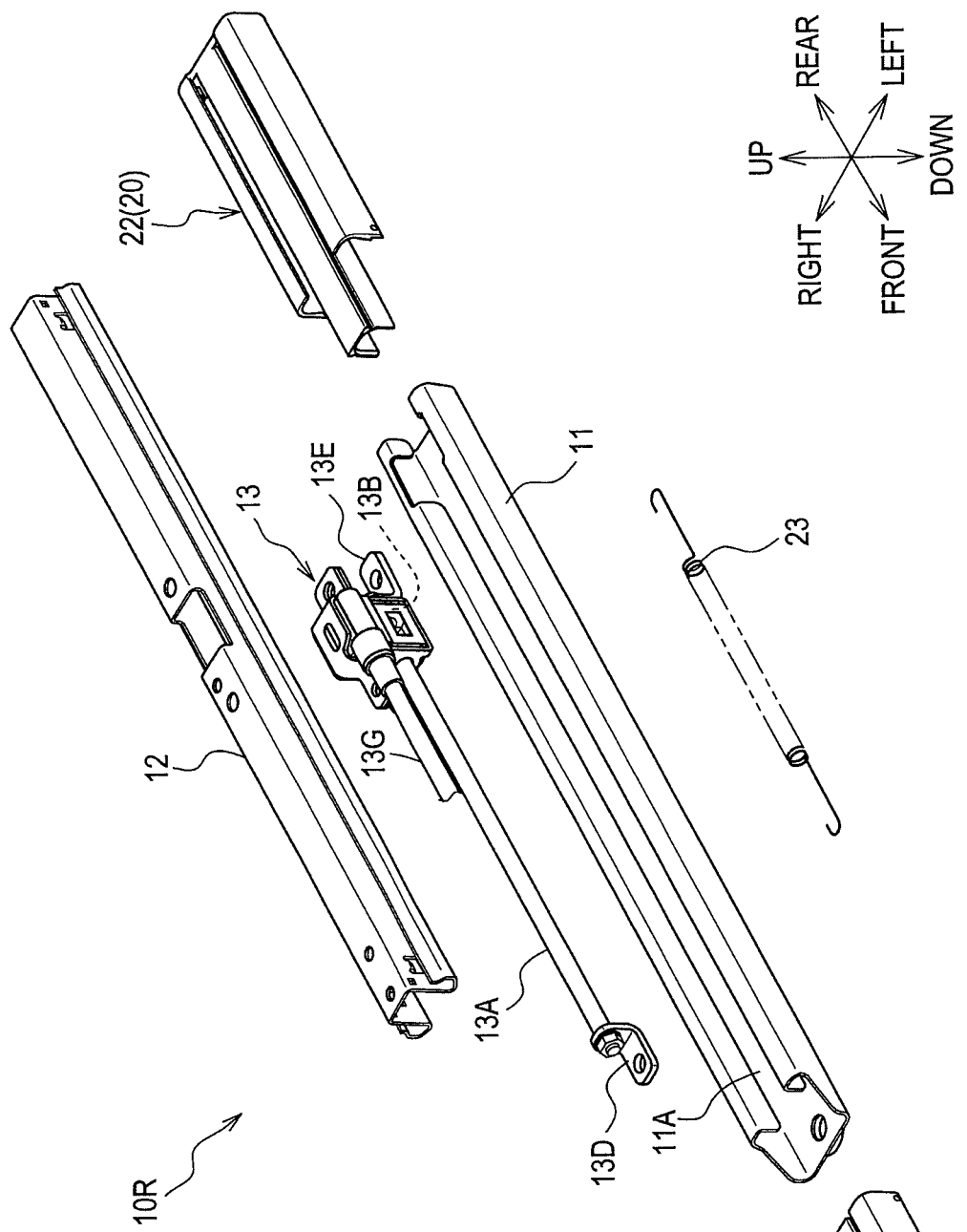
FIG. 4 is an exploded view of the first sliding device according to the first embodiment.

A longitudinal direction of the fixed rail 11 according to the present embodiment coincides with a front-rear direction of the vehicle. The fixed rail 11, as shown in FIG. 4, is provided with an opening 11A that opens upward. The opening 11A is provided along the longitudinal direction.

Figure 2:
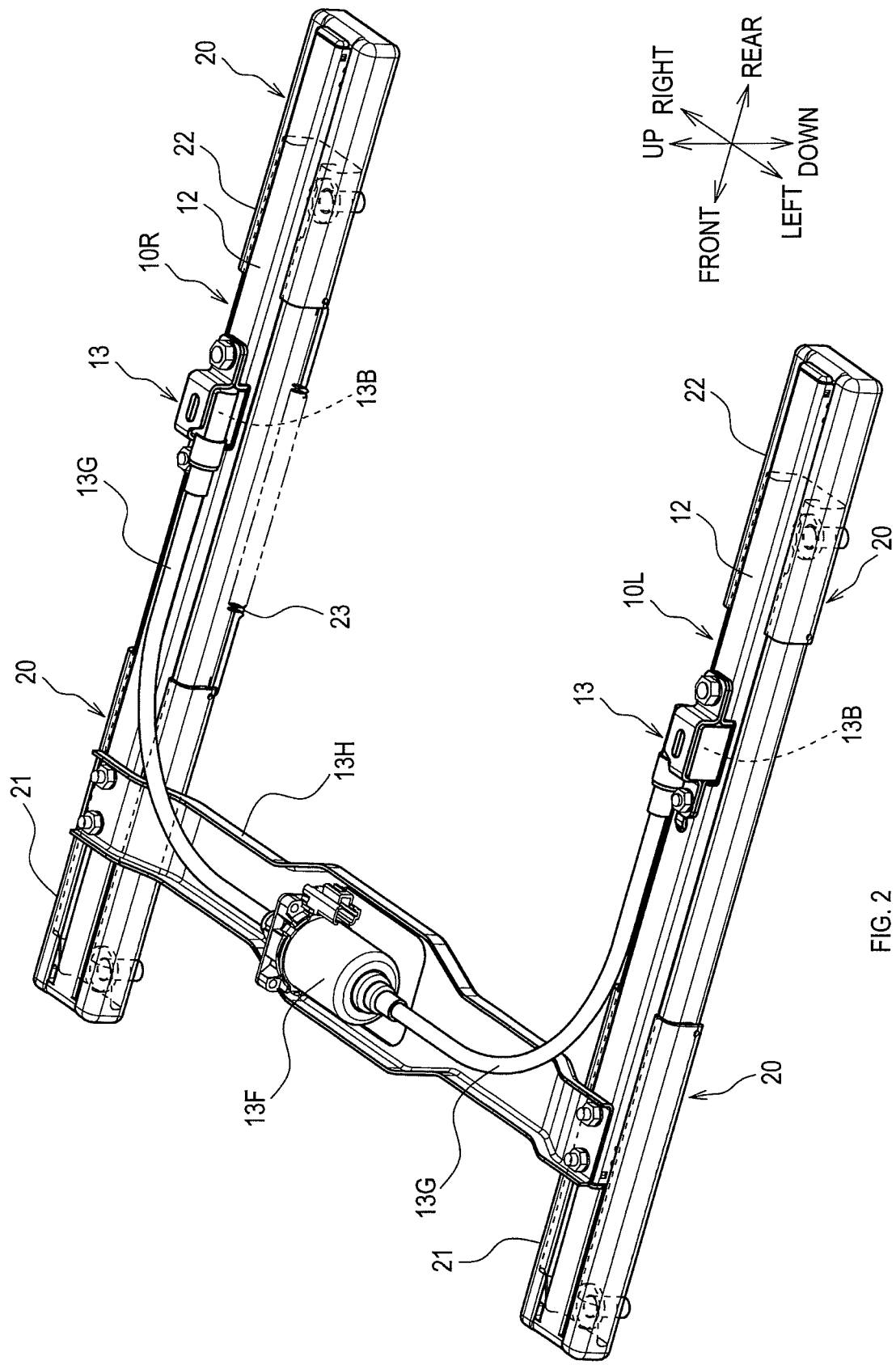
FIG. 2 is a view of a first and a second sliding device according to a first embodiment.
Figure 5:
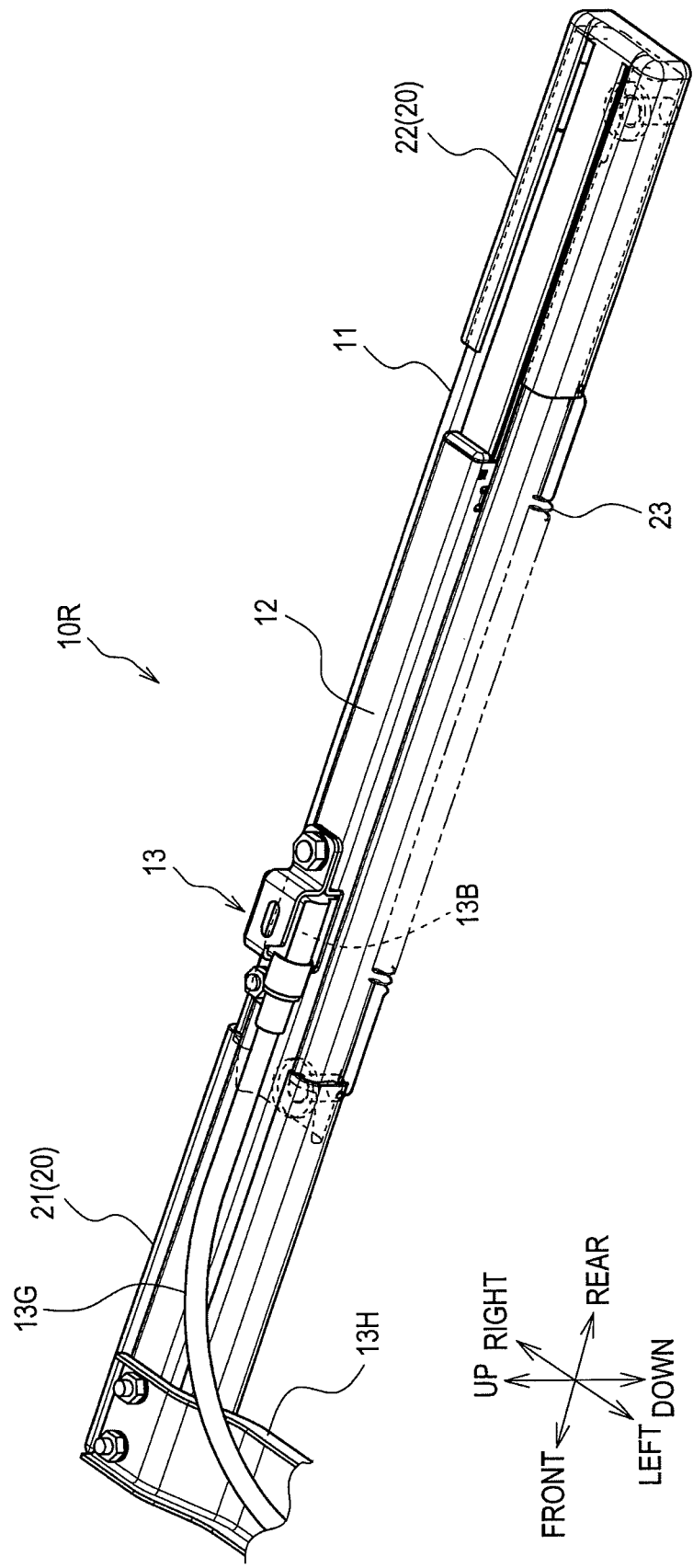
FIG. 5 is a view of the first sliding device according to the first embodiment.

The seat main body 2 is secured to the movable rail 12. The movable rail 12, as shown in FIGS. 2 and 5, is slidable with respect to the fixed rail 11 in a state in which at least a part of the movable rail 12 is exposed from the opening 11A.

The "state in which at least a part of the movable rail 12 is exposed from the opening 11A" indicates a state in which at least a part of the movable rail 12 can be viewed by the occupant who looks at the first sliding device 10R from above.

Thus, the "exposed state" described above is not limited to a state in which an upper end of the movable rail 12 protrudes from an upper end of the fixed rail 11. That is, even if the upper end of the movable rail 12 is lower than the upper end of the fixed rail 11, the "state in which at least a part of the movable rail 12 is exposed from the opening 11A" can occur.

<Slide Mechanism>

Figure 6:
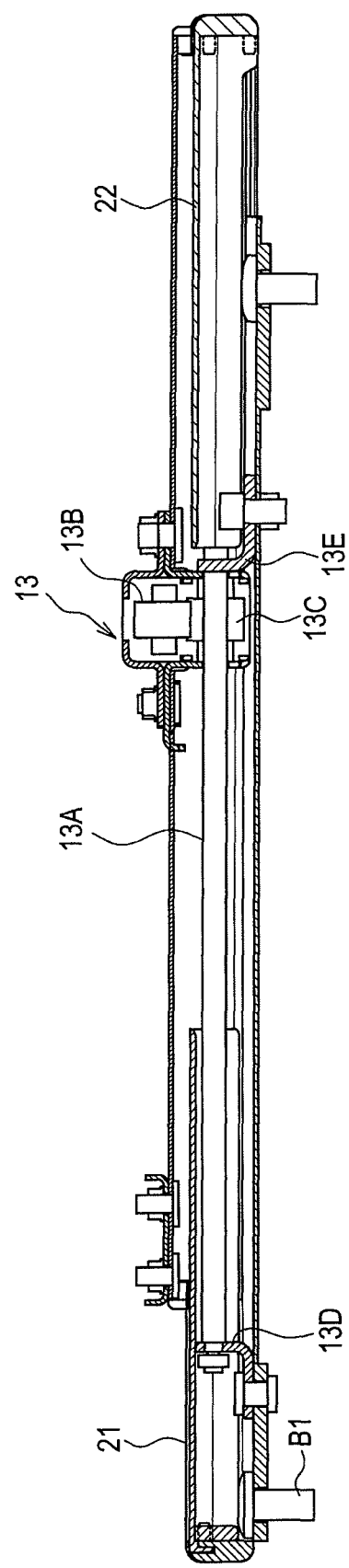
FIG. 6 is a cross-sectional view of the first sliding device according to the first embodiment.

A slide mechanism 13 moves the seat main body 2 with respect to the fixed rail 11. The slide mechanism 13, as shown in FIG. 6, includes a screw rod 13A and a nut portion 13B.

The screw rod 13A and retaining brackets 13D, 13E are arranged inside the fixed rail 11. The screw rod 13A is a male screw that extends along the longitudinal direction of the fixed rail 11. The retaining brackets 13D, 13E are members that hold the screw rod 13A.

The retaining bracket 13D holds a first end in an extending direction of the screw rod 13A (end on a seat front side, in the present embodiment). The retaining bracket 13E holds a second end in the extending direction of the screw rod 13A (end on a seat rear side, in the present embodiment).

The nut portion 13B is held by the movable rail 12. The nut portion 13B includes a nut 13C provided with a female screw that meshes with the screw rod 13A. The nut 13C receives a rotational force from an electric motor 13F shown in FIG. 2 to rotate.

The rotational force of the electric motor 13F, as shown in FIG. 2, is transmitted to the nut 13C via a transmission member 13G such as a rotation cable. The electric motor 13F is fixed to a bridge portion 13H.

The bridge portion 13H extends in the seat-width axis between the first sliding device 10R and the second sliding device 10L. A left end in an extending direction of the bridge portion 13H is fixed to the movable rail 12 on a left side in the seat-width axis. A right end in the extending direction of the bridge portion 13H is fixed to the movable rail 12 on a right side in the seat-width axis.

The screw rod 13A, as shown in FIG. 6, is held by the fixed rail 11 in a state in which its rotation is inhibited by the two retaining brackets 13D, 13E. Therefore, when the nut 13C rotates, the movable rail 12, that is, the seat main body 2 moves with respect to the fixed rail 11 due to "principle of screw".

<Shutter Mechanism>

A shutter mechanism 20, as shown in FIG. 3, inhibits the inside of the fixed rail 11 (especially, the screw rod 13A) from being viewable from the opening 11A. The shutter mechanism 20 includes the first rail cover 21 and the second rail cover 22.

The first rail cover 21 closes the opening 11A at a first end in the longitudinal direction of the fixed rail 11 (front end, in the present embodiment). The second rail cover 22 closes the opening 11A at a second end in the longitudinal direction of the fixed rail 11 (rear end, in the present embodiment).

Therefore, the inside of the fixed rail 11 is inhibited from being viewable. The opening 11A between the first rail cover 21 and the second rail cover 22 is closed with the movable rail 12. Thus, the opening 11A is in a closed state over the entire region in the longitudinal direction.

2.2 Structure and Operation of Shutter Mechanism

The first rail cover 21, as shown in FIG. 3, covers an outer periphery of the first end in the longitudinal direction of the fixed rail 11 (front end, in the present embodiment). Also, the first rail cover 21 is slidable in the longitudinal direction. The first rail cover 21, as shown in FIG. 5, is displaced by sliding with the movable rail 12 when a first end in the longitudinal direction of the movable rail 12 is displaced to protrude from the first end in the longitudinal direction of the fixed rail 11.

When the first end in the longitudinal direction of the movable rail 12 is located inside the fixed rail 11, the first rail cover 21 is in a stationary state while covering the first end in the longitudinal direction of the fixed rail 11, and does not slide in conjunction with the movable rail 12.

The second rail cover 22, as shown in FIG. 3, covers an outer periphery of the second end in the longitudinal direction of the fixed rail 11 (rear end, in the present embodiment). Also, the second rail cover 22 is slidable in the longitudinal direction. The second rail cover 22 is displaced by sliding with the movable rail 12 when a second end in the longitudinal direction of the movable rail 12 is displaced to protrude from the second end in the longitudinal direction of the fixed rail 11.

When the second end in the longitudinal direction of the movable rail 12 is located inside the fixed rail 11, the second rail cover 22 is in a stationary state while covering the second end in the longitudinal direction of the fixed rail 11 and does not slide in conjunction with the movable rail 12.

Figure 7:
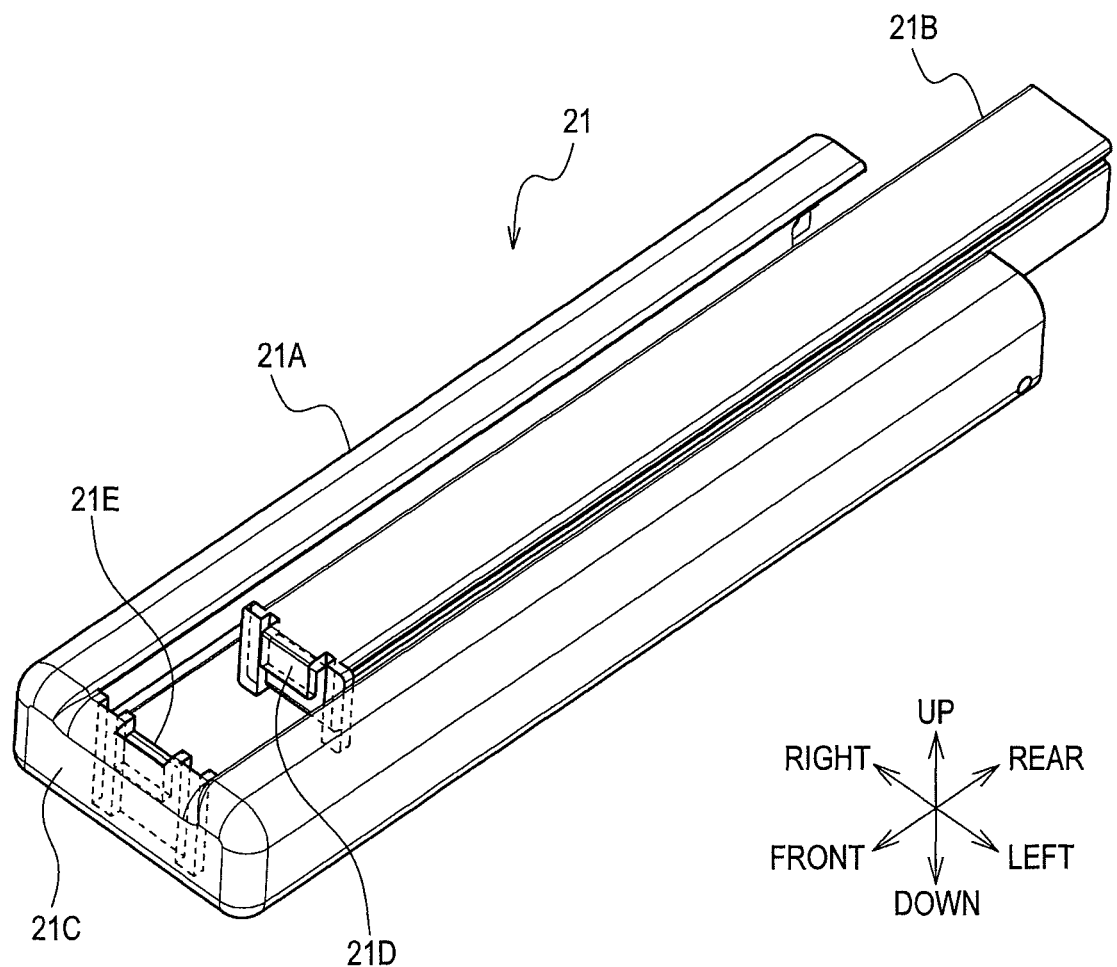
FIG. 7 is a view of a first rail cover according to the first embodiment.

The first rail cover 21, as shown in FIG. 7, includes a cover main body 21A and a screw cover 21B. The cover main body 21A is a member made of resin, and, as shown in FIG. 8, covers side surfaces 11B, 11C and an upper surface 11D in a width axis of the fixed rail 11.

The cover main body 21A, as shown in FIG. 7, is a semi-cylindrical member extending in a direction parallel to the longitudinal direction of the fixed rail 11. The cover main body 21A can make a sliding contact with the surfaces 11B, 11C. The "width axis" mentioned above indicates a horizontal direction orthogonal to the longitudinal direction of the fixed rail 11.

Figure 8:
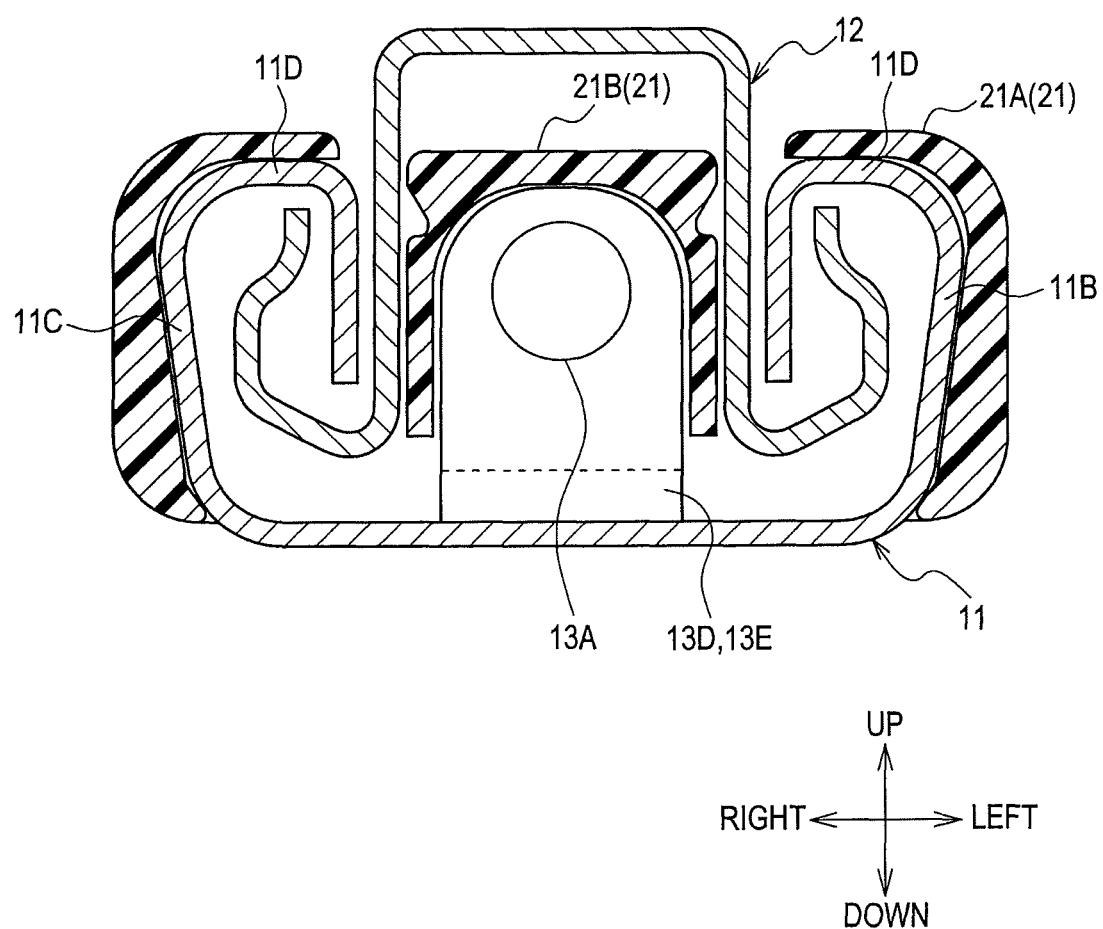
FIG. 8 is a cross-sectional view showing the first rail cover, a fixed rail and a movable rail according to the first embodiment.

The screw cover 21B extends in a direction parallel to the screw rod 13A, and, as shown in FIG. 8, covers the screw rod 13A from above. Particularly, a cross-sectional shape of the screw cover 21B is formed into a substantially U-shape with its bottom side opened.

The screw cover 21B is detachably attached to the cover main body 21A. A first end in an extending direction of the cover main body 21A (front end, in the present embodiment), as shown in FIG. 7, is closed with an end wall 21C.

Figure 9:
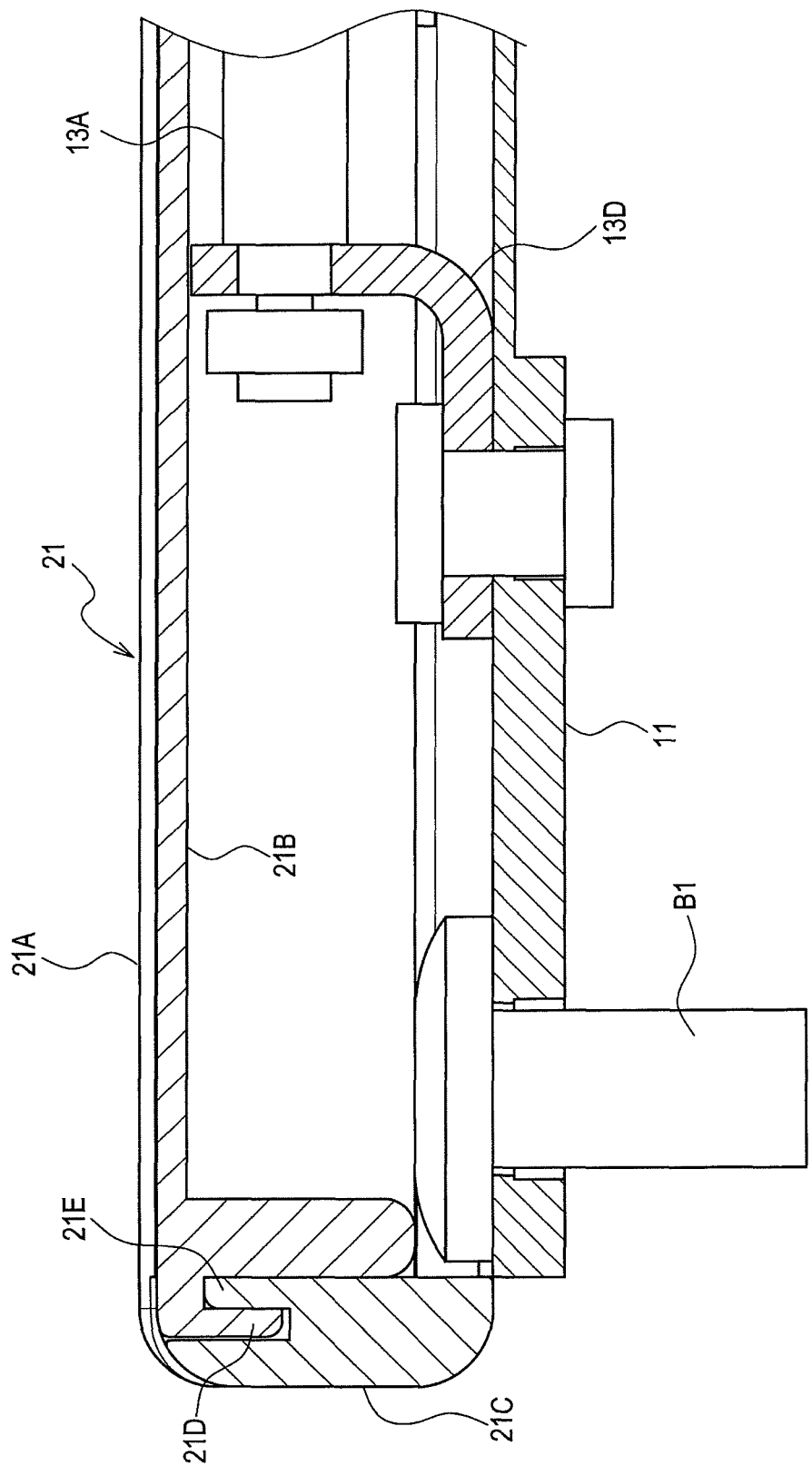
FIG. 9 is a cross-sectional view showing a structure of the first sliding device according to the first embodiment.

A locking portion 21D made of resin is provided at a first end in the longitudinal direction of the screw cover 21B. A locked portion 21E made of resin is provided at a part of the end wall 21C facing the locking portion 21D. The locking portion 21D, as shown in FIG. 9, can be caught by the locked portion 21E so as to be retained by the locked portion 21E.

At least one of the locking portion 21D and the locked portion 21E can be elastically deformed and displaced. Therefore, the locking portion 21D can be detachably retained by the locked portion 21E like a snap fit.

The locking portion 21D is integrally formed with resin together with the screw cover 21B. The locked portion 21E is integrally formed with the end wall 21C. That is, the locked portion 21E is integrally formed with the cover main body 21A.

The screw cover 21B, as shown in FIG. 8, can be housed in the movable rail 12. The movable rail 12 can slide relative to the screw cover 21B when the screw cover 21B is housed in the movable rail 12.

In other words, when the first end in the longitudinal direction of the movable rail 12 is located inside the fixed rail 11, the cover main body 21A and the screw cover 21B are in a stationary state with respect to the fixed rail 11. The movable rail 12 can slide relative to the cover main body 21A and the screw cover 21B which are in a stationary state.

Figure 10:
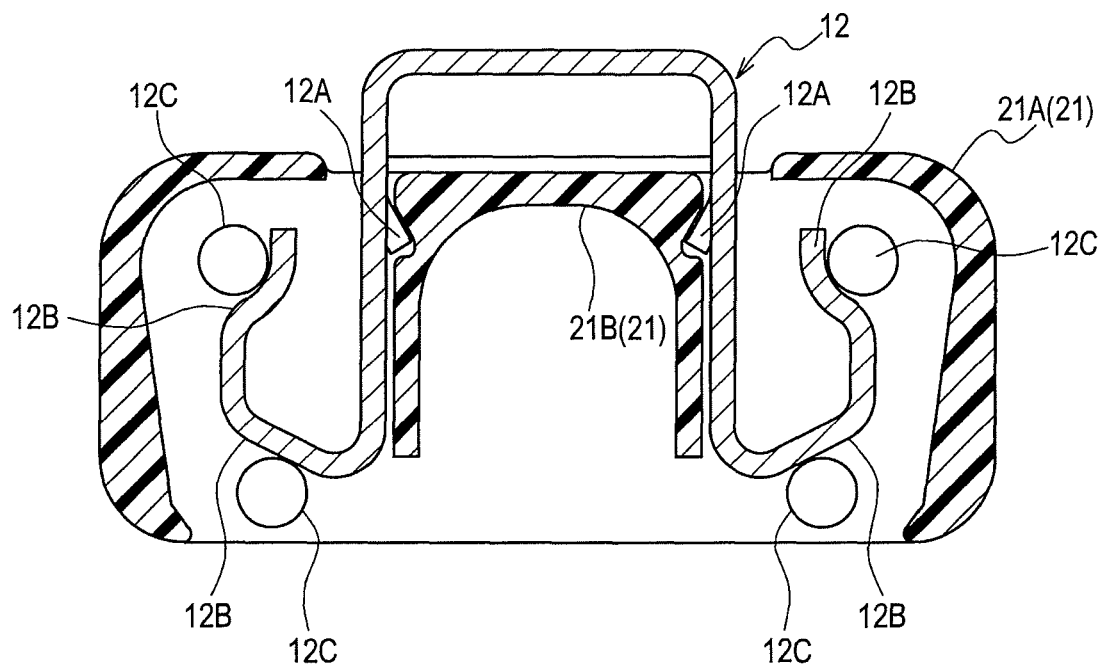
FIG. 10 is a cross-sectional view showing the first rail cover, the fixed rail and the movable rail according to the first embodiment.
Figure 10:
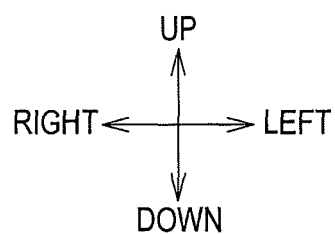

As shown in FIG. 10, a guide portion 12A that makes a sliding contact with the screw cover 21B is provided inside the movable rail 12. The guide portion 12A guides a relative displacement of the screw cover 21B with respect to the movable rail 12.

As shown in FIGS. 1 to 3, a spring 23 is provided outside the fixed rail 11. The spring 23 applies to the first rail cover 21 an elastic force that displaces by sliding the first rail cover 21 toward the second end in the longitudinal direction of the fixed rail 11 (rear end, in the present embodiment).

The spring 23 according to the present embodiment is coupled to the first rail cover 21 at one end, and is coupled to the second rail cover 22 at the other end. Thus, the spring 23 applies to the second rail cover 22 an elastic force that displaces by sliding the second rail cover 22 toward the first end in the longitudinal direction of the fixed rail 11 (front end, in the present embodiment).

The second rail cover 22 has the same structure as that of the first rail cover 21, and operates in the same manner as the first rail cover 21. Therefore, a description of the second rail cover 22 that overlaps with a description of the first rail cover 21 is not to be repeated.

3. Features of Vehicle Seat (Especially, First and Second Sliding Devices) According to the Present Embodiment The first sliding device 10R covers the outer periphery of the first end in the longitudinal direction of the fixed rail 11, and includes the first rail cover 21 and the second rail cover 22 that can slide in the longitudinal direction. The first rail cover 21 and the second rail cover 22 are displaced by sliding with the movable rail 12 when the first end in the longitudinal direction of the movable rail 12 is displaced to protrude from the first end in the longitudinal direction of the fixed rail 11.

Therefore, even if the movable rail 12 largely slides and the track face 12B of the movable rail 12, shown in FIG. 10 is exposed from the fixed rail 11, for example, it is possible to inhibit a lubricant from adhering to parts other than the first sliding device 10R (shoes of the occupant, for example).

The track face 12B, as shown in FIG. 10, is a part with which the rolling element 12C such as a steel ball of the movable rail 12 makes a rolling contact, or a sliding member such as a shoe makes a sliding contact. Thus, a lubricant such as grease is often applied to the track face 12B.

The fixed rail 11, as shown in FIG. 9, is generally secured to the vehicle by a mechanical fastener such as a bolt B1. A bolt hole into which the bolt B1 is inserted is provided at an end in the longitudinal direction of the fixed rail 11.

Therefore, when an entire periphery of the end in the longitudinal direction of the fixed rail 11 is covered with the first rail cover 21, an operator who performs assembling work cannot insert the bolt B1 into the bolt hole.

The operator is required to insert the bolt B1 into the bolt hole and tighten the bolt B1 before assembling the first rail cover 21 and the second rail cover 22 into the fixed rail 11. Thus, assembling workability of the bolt B1 may deteriorate.

Figure 11A:
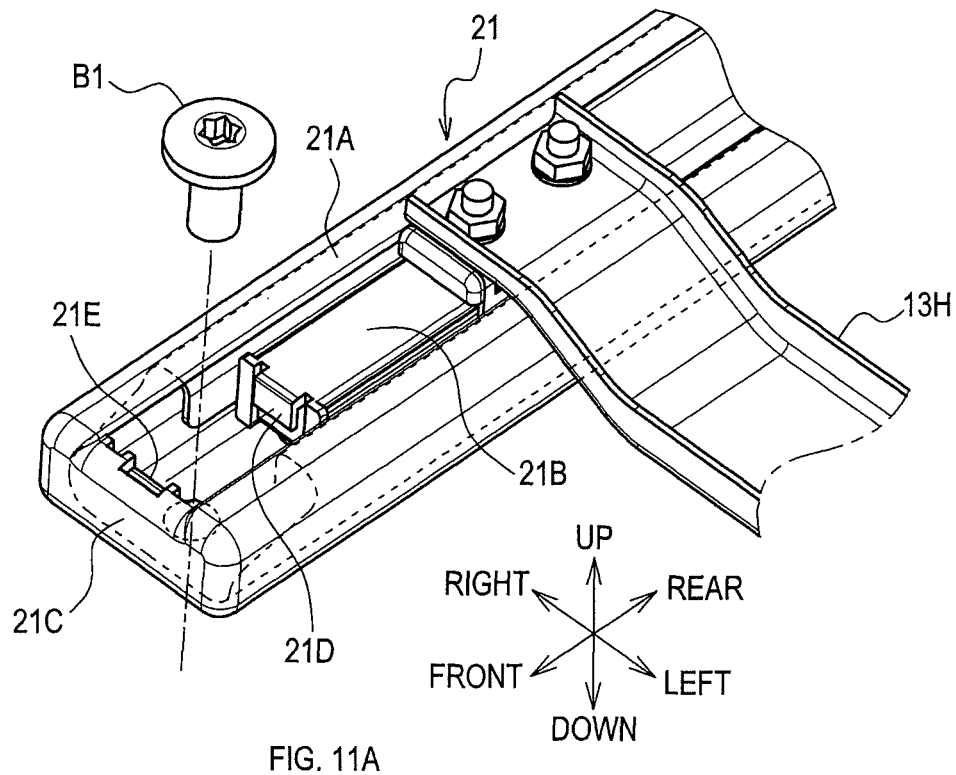
FIGS. 11A and 11B are explanatory views of features of the first sliding device according to the first embodiment.
Figure 11B:
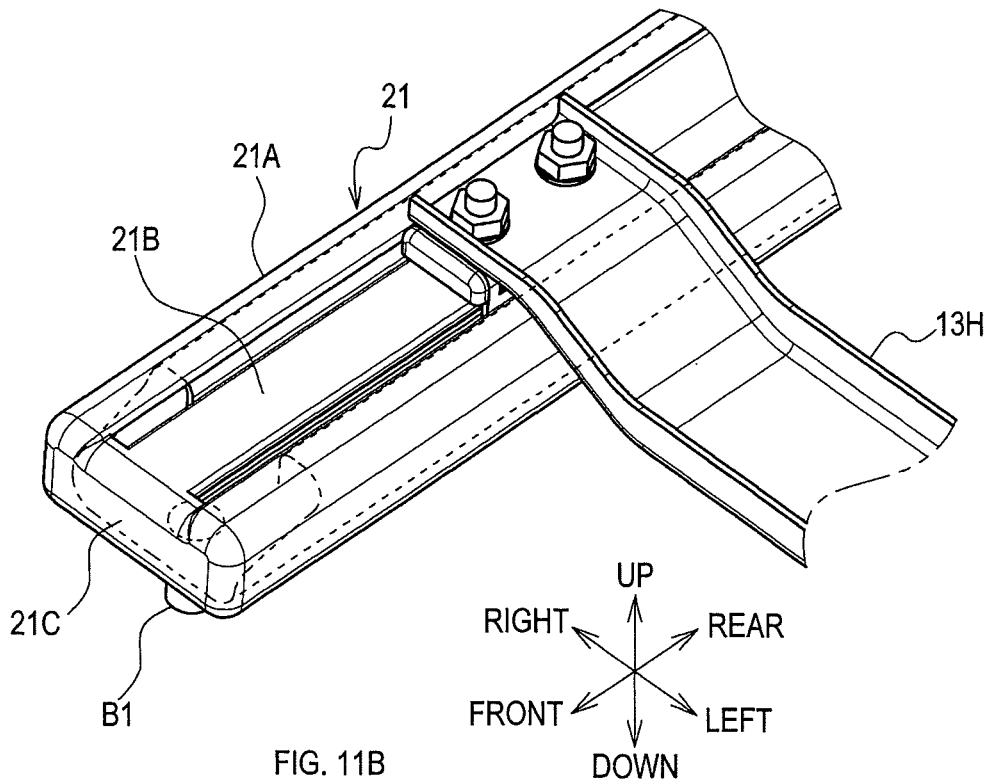

In contrast, the first rail cover 21 and the second rail cover 22 according to the present embodiment includes the screw cover 21B to be detachably attached to the cover main body 21A. Therefore, the operator, as shown in FIG. 11A, after inserting the bolt B1 into the bolt hole and tighten the bolt B1, as shown in FIG. 11B, may attach the screw cover 21B to the first rail cover 21. Assembling workability of the bolt B1 can be improved.

The locking portion 21D or the locked portion 21E for detachably attaching the screw cover 21B to the cover main body 21A is elastically deformable upon attachment/detachment of the screw cover 21B. Thus, the operator can easily attach the screw cover 21B to the first rail cover 21.

The spring 23 that applies an elastic force to the first rail cover 21 and the second rail cover 22 is provided outside the fixed rail 11. Thus, the operator, as compared to a configuration in which the spring 23 is arranged inside the fixed rail 11, can easily install the spring 23.

The spring 23 is coupled to the first rail cover 21 at one end, and is coupled to the second rail cover 22 at the other end. Therefore, as compared to a case in which a spring is provided in each of the first rail cover 21 and the second rail cover 22, the number of springs can be reduced. Increase in the number of assembling steps due to increase in the number of components can be inhibited.

Second Embodiment

Figure 12:
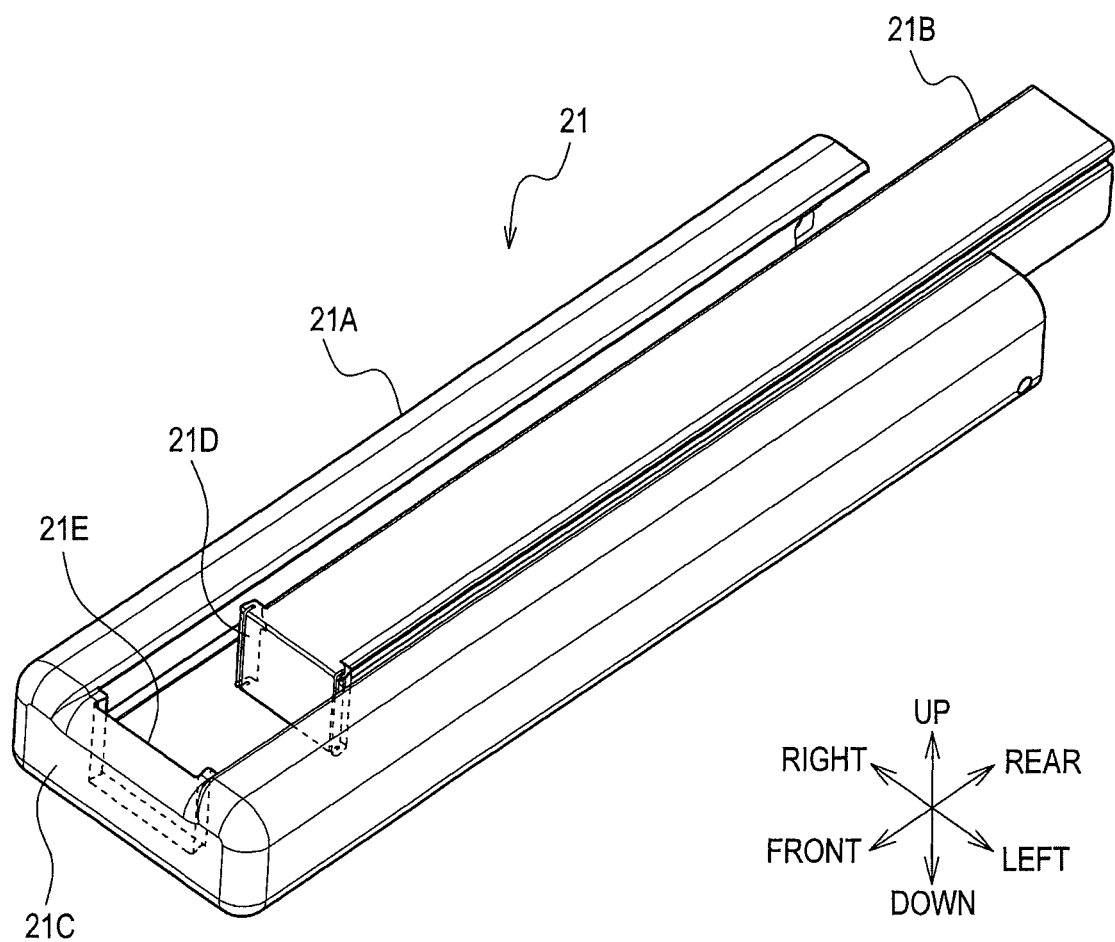
FIG. 12 is a view showing features of the first sliding device according to a second embodiment.

The locking portion 21D and the locked portion 21E according to the first embodiment, as shown in FIG. 9, are hook-shaped. In contrast, as shown in FIG. 12, the locking portion 21D and the locked portion 21E are fitted to each other in the present second embodiment.

In other words, the locking portion 21D is fitted into the concave locked portion 21E thereby to be retained by the locked portion 21E. Components or the like that are similar to those of the above-described embodiment are denoted with the same reference numbers, and will not be further described.

Other Embodiments

The first rail cover 21 and the second rail cover 22 according to the above-described embodiments include the cover main body 21A and the screw cover 21B. However, for example, the first rail cover 21 and the second rail cover 22 may not include the screw cover 21B or the cover main body 21A.

The screw cover 21B according to the above-described embodiments is attachable to and detachable from the cover main body 21A. However, for example, the cover main body 21A and the screw cover 21B may be integrally formed.

The spring 23 according to the above-described embodiments is arranged outside the fixed rail 11 on a side in which the first sliding device 10R and the second sliding device 10L face each other. In other words, the spring 23 is arranged between the two fixed rails 11. However, for example, the spring 23 may be arranged inside the fixed rail 11, or arranged outside the fixed rail 11 on a side opposite to the side in which the first sliding device 10R and the second sliding device 10L face each other.

The spring 23 according to the above-described embodiments is coupled to the first rail cover 21 at one end, and is coupled to the second rail cover 22 at the other end. However, for example, at least one of the first sliding device 10R and the second sliding device 10L may include a first spring coupled to the first rail cover 21, and a second spring couple to the second rail cover 22.

The first sliding device 10R and the second sliding device 10L according to the above-described embodiments each have the screw rod 13A and the nut 13C. The nut 13C is rotationally driven by the electric motor 13F.

However, for example, at least one of the first sliding device 10R and the second sliding device 10L may be configured as (a) a manual sliding device without the screw rod 13A and the nut 13C, (b) a sliding device in which the screw rod 13A is rotationally driven by an electric motor, or (c) a sliding device in which the nut 13C is provided in the fixed rail 11 and the screw rod 13A is provided in the movable rail 12.

In the above-described embodiments, an example of a vehicle seat has been described. However, the present disclosure can be also applied to a seat for use in a vehicle such as railway vehicles, ships, and aircrafts, as well as to a stationary type seat for use such as in theatres and at home.

Furthermore, the present disclosure is not limited to the above-described embodiments as long as the present disclosure meets the gist of the invention recited in the claims. Thus, at least two embodiments among the plurality of embodiments described above may be combined.

What is claimed is:

1. A sliding device that slidably supports a seat main body of a vehicle seat, comprising:
    a fixed rail that is directly or indirectly fixed to a floor;
    a movable rail to which the seat main body is secured, the movable rail being slidable with respect to the fixed rail in a state in which at least a part of the movable rail is housed in the fixed rail; and
    a rail cover that covers an outer periphery of a first end in a longitudinal direction of the fixed rail and is slidable in the longitudinal direction, the rail cover being displaced by sliding together with the movable rail, when a first end in a longitudinal direction of the movable rail is displaced to protrude from the first end in the longitudinal direction of the fixed rail;
    a screw rod that is fixed inside the fixed rail, and extends in a direction parallel to the longitudinal direction of the fixed rail; and
    a nut that meshes with the screw rod, the nut being rotatably supported by the movable rail and receiving a rotational force to rotate,
    wherein the rail cover includes a cover main body, and a screw cover that is detachably attached to the cover main body and covers the screw rod.

2. The sliding device according to claim 1, further comprising:
    a locking portion for detachably attaching the screw cover to the cover main body, the locking portion being elastically deformed upon attachment/detachment of the screw cover.

3. The sliding device according to claim 1, further comprising:
    a spring that is disposed outside the fixed rail and applies to the rail cover an elastic force that displaces by sliding the rail cover toward a second end in the longitudinal direction of the fixed rail.

4. The sliding device according to claim 3, further comprising:
    a second rail cover that covers an outer periphery of the second end in the longitudinal direction of the fixed rail and is slidable in the longitudinal direction, the second rail cover being displaced by sliding with the movable rail, when a second end in the longitudinal direction of the movable rail is displaced to protrude from the second end in the longitudinal direction of the fixed rail,
    wherein the spring is coupled to the rail cover at one end, and is coupled to the second rail cover at the other end.

5. The sliding device according to claim 1,
    wherein the sliding device is configured to slidably support the seat main body, and
    wherein the seat main body includes a seat cushion.

6. A sliding device that slidably supports a seat main body of a vehicle seat, comprising:
    a fixed rail that is directly or indirectly fixed to a floor;

a movable rail to which the seat main body is secured, the movable rail being slidable with respect to the fixed rail in a state in which at least a part of the movable rail is housed in the fixed rail;

a rail cover that covers an outer periphery of a first end in a longitudinal direction of the fixed rail and is slidable in the longitudinal direction, the rail cover being displaced by sliding together with the movable rail, when a first end in a longitudinal direction of the movable rail is displaced to protrude from the first end in the longitudinal direction of the fixed rail;

a spring that is disposed outside the fixed rail and applies to the rail cover an elastic force that displaces by sliding the rail cover toward a second end in the longitudinal direction of the fixed rail; and a second rail cover that covers an outer periphery of the second end in the longitudinal direction of the fixed rail and is slidable in the longitudinal direction, the second rail cover being displaced by sliding with the movable rail, when a second end in the longitudinal direction of the movable rail is displaced to protrude from the second end in the longitudinal direction of the fixed rail, wherein the spring is coupled to the rail cover at one end, and is coupled to the second rail cover at the other end.

* * * * *